US006331265B1

(12) United States Patent
Dupire et al.

(10) Patent No.: US 6,331,265 B1
(45) Date of Patent: Dec. 18, 2001

(54) REINFORCED POLYMERS

(75) Inventors: Marc Dupire, Mons; Jacques Michel, Seneffe, both of (BE)

(73) Assignee: Atofina Research, Feluy (BE)

( * ) Notice: Subject to any disclaimer, the term of this patent is extended or adjusted under 35 U.S.C. 154(b) by 0 days.

(21) Appl. No.: 09/574,659

(22) Filed: May 18, 2000

(30) Foreign Application Priority Data

May 18, 1999 (EP) .................................................. 99109785

(51) Int. Cl.⁷ ...................................................... C08K 7/24
(52) U.S. Cl. ........................ 264/289.3; 264/119; 264/120; 264/280; 264/288.4; 264/319; 264/340
(58) Field of Search ................................... 264/319, 340, 264/119, 120, 280, 288.4, 289.3

(56) References Cited

FOREIGN PATENT DOCUMENTS 1179569   1/1970   (GB) .
9715934   5/1997   (WO) .

OTHER PUBLICATIONS

Murphy, Reinforced Plastics Handbook, p. 167, 1944.*

\* cited by examiner

*Primary Examiner*—Rich Weisberger
(74) *Attorney, Agent, or Firm*—Jim D. Wheelington

(57) ABSTRACT

Provided is a method for the production of a reinforced polymer, which method comprises:
 (a) introducing carbon nanotubes into a polymer to provide a mixture of the polymer and the nanotubes;
 (b) stretching the mixture at or above the melting temperature ($T_m$) of the polymer to orient the carbon nanotubes; and
 (c) stretching the mixture in the solid state to further orient the carbon nanotubes.

10 Claims, No Drawings

REINFORCED POLYMERS

BACKGROUND TO THE INVENTION

The present invention is concerned with a method for producing a reinforced polymer by introducing carbon nanotubes into the polymer. The invention also relates to reinforced polymers produced by the present methods and the use of carbon nanotubes for improving the mechanical properties of polymers.

It has been known for many years that blending fibres, such as carbon fibres, with polymers can significantly improve the mechanical properties of the blends (see Polymer Composites, April 1987, Vol. 8, No. 2, 74–81; J. Composite Materials, Vol. 3, October 1969, 732–734; and Polymer Engineering and Science, January 1971, Vol. 11, No. 1, 51–56). GB 1179569A discloses a method of reinforcing polymers by the incorporation of long fibres of material such as metal, glass or asbestos. The advantage of carbon fibres is that they are very light, but despite this exhibit relatively great mechanical strength. In particular they exhibit very high stiffness.

More recently, since the discovery of Buckminsterfullerene ($C_{60}$), it has been found that carbon tubes (often termed carbon nanotubes because of their diminutive dimensions) having a structure related to the structure of $C_{60}$ exist, which have the potential to be used in similar ways to carbon fibres. In particular, the structure of carbon nanotubes makes their aspect ratio (length/diameter, L/D) comparable to that of long fibres. Typically the aspect ratio of carbon nanotubes is >10000. Thus, the aspect ratio of carbon nanotubes is generally much greater than that of conventional short fibres, such as short glass fibres and short carbon fibres. In addition, the tubes can potentially be lighter than conventional carbon fibres, whilst being stronger and stiffer than the best conventional carbon fibres (see P. Calvert "Potential application of nanotubes" in Carbon Nanotubes, Editor T. W. Ebbeson, 297, CRC, Boca Raton, Fla. 1997).

Depending on their diameter, helicity, and number of layers (single-wall v. multiple-wall) carbon nanotubes have electronic properties between those of conductors and semiconductors. They may thus be added to an electrically insulating polymer to increase its conductivity. WO 97/15934 discloses an electrically conductive polymer composition containing carbon nanotubes. In addition, carbon nanotubes have great mechanical strength, being cited as having bending modulus values of from 1000–5000 GPa. Moreover they have been mentioned in connection with new, highly efficient, fracture micromechanisms which would prevent pure brittle failure with a concomitant low strain. Thus, carbon nanotubes have been envisaged for use in many applications in recent years (see P. Calvert "Potential application of nanotubes" in Carbon Nanotubes, Editor T. W. Ebbeson, 297, CRC, Boca Raton, Fla. 1997; T. W. Ebbeson, "Carbon Nanotubes", Annu. Rev. Mater. Sci., 24, 235, 1994; Robert F. Service, "Super strong nanotubes show they are smart too", Science, 281, 940, 1998; and B. I. Yakobson and R. E. Smalley, "Une technologie pour le troisième millénaire: les nanotubes", La Recherche, 307, 50, 1998).

However, in the past when producing polyolefin composites by incorporating carbon nanotubes, tangling of the nanotubes and consequent randomising of the orientations of the nanotubes has caused problems (see M. S. P. Shaffer, X. Fan, A. H. Windle, "Dispersion of carbon nanotubes: polymeric analogies", poster 39, p. 317 in Proceedings of Polymer '98", September 1998, Brighton (UK); P. M. Ajayan, "Aligned carbon nanotubes in thin polymer films", Adv. Mater., 7, 489, 1995; H. D. Wagner, O. Lourie, Y. Feldman and R. Tenne, "Stress-induced fragmentation of multi-wall carbon nanotubes in a polymer matrix", Appl. Phys. Lett., 72 (2), 188, 1998; and K. Yase, N. Tanigaki, M. Kyotani, M. Yomura, K. Uchida, S. Oshima, Y. Kuriki and F. Ikazaki, Mat. Res. Soc. Symp. Proc., Vol. 359, 81, 1995). In particular, tangling can give rise to a reduction in the homogeneity of fibre/polymer blends since it is difficult for the fibres to distribute themselves evenly within the surrounding polymer matrix. This reduces the mechanical strength of the blends, since lack of homogeneity introduces weak points in a blend at positions where, for instance, there is a relatively low concentration of fibre and a high concentration of polymer. Moreover the randomising of the orientation of the fibres also reduces the mechanical strength of the blends. This is because (for example) the maximum resistance to strain in a given direction will be achieved when all of the fibres in the blend are oriented with their longitudinal axes aligned in that direction. The further that a blend deviates from such an ideal orientation, the less the resistance to strain of the blend in that direction. However, up to present it has not been possible to control the orientation of the fibres to a degree sufficient to improve mechanical properties.

SUMMARY OF THE INVENTION

It is an aim of the present invention to overcome the problems associated with the above blends and methods. Accordingly, the present invention provides a method for the production of a reinforced polymer, which method comprises:

(a) introducing carbon nanotubes into a polymer to provide a mixture of the polymer and the nanotubes;

(b) stretching the mixture at or above the melting temperature ($T_m$) of the polymer to orient the carbon nanotubes; and (c) stretching the mixture in the solid state to further orient the carbon nanotubes.

The present invention further provides use of oriented carbon nanotubes in a polymer to reinforce the polymer.

DESCRIPTION OF THE PREFERRED EMBODIMENTS

In the present invention, the polymer is not particularly limited as long as the polymer can be oriented in the molten and in the solid state. In a preferred embodiment, the polymer is preferably a polyolefin, such as a polyethylene or a polypropylene or blends thereof. When the polyolefin is a polymer of an olefin monomer having 3 or more carbon atoms, such as polypropylene, the polyolefin may be isotactic or syndiotactic. A particularly preferred polymer is isotactic polypropylene, iPP. Other polymers which can be used in the present invention include polyesters, such as PETs and PEEKs, polyamides, PVCs, and polystyrenes.

The present invention is advantageous in that it succeeds in orienting the carbon nanotubes within the polymer such that their longitudinal axes are more aligned with each other than would otherwise be the case. In this invention 'orienting' is intended to mean a degree of disentangling of the carbon nanotubes and/or a degree of aligning of the carbon nanotubes. Not only are the nanotubes oriented, but also the individual polymer molecules undergo a degree of orientation in the present method. Orientation of the nanotubes leads to a greater homogeneity and less tangling in the resulting blends, and a consequent significant improvement in the mechanical properties of the blends. In particular, superior tensile modulus (as measured at 10% strain, hereafter termed modulus (10%) and tenacity can be achieved by the present blends as compared with known blends, whilst still retaining a relatively high toughness (the product of tenacity and strain).

For these reasons, the reinforced polymers of the present invention are useful in a wide variety of applications involving the reinforcement of polymers, including use in fishing gear, tyres, safety belts, sewing thread, protective clothing, durable man-made fibre, and in cement paste, mortar or concrete. The reinforced polymers of the present invention are particularly useful in high tenacity polyolefin fibres and filaments as a replacement for conventional reinforcing agents (see, for example, M. Ahmed, "Polypropylene Fibres—Science and Technology", Textile Science and Technology 5, High tenacity industrial yarns 389–403 and 665–681, Elsevier Amsterdam 1982).

The stretching procedure of the present method comprises two sequential steps: stretching the polymer/nanotube mixture in the molten state (step b) and subsequently stretching the solidified material (step c).

Stretching step (b) may comprise one of many traditional ways of processing polyolefins, including fibre melt spinning, extrusion, thermoforming and injection moulding. In a preferred embodiment of the present method, stretching step (b) comprises extruding the polymer/nanotube mixture. The extrusion step is carried out at a temperature at or above the melt temperature ($T_m$) of the polymer, so that the polymer is molten. Extrusion can be adapted to form a polymer fibre (e.g. by melt spinning) or to form a polymer sheet (e.g. by extrusion through a slit die or by compression moulding). In a preferred embodiment, the extrusion step is carried out by extruding the mixture through a spinneret to produce a fibre.

The method of producing the precursor composite (the mixture produced prior to solid state stretching) may be important, since it can affect the efficiency and the ease of orientation of the composites. For example, fast cooling isotactic polypropylene melt will produce the smectic crystalline form, which can deform much more easily in the solid state than the monoclinic crystalline form. Thus, in a preferred embodiment, after stretching in the molten state a desired cooling protocol is selected in order that the most desirable precursor composite is obtained.

In step (c), the polymer is preferably stretched at a temperature at or above its glass transition temperature, $T_g$, and below its melting temperature, $T_m$. Preferably this stretching step comprises solid state drawing. This typically involves drawing the polymer in the form of a fibre or sheet across a series of rollers. If desired the stretching step can be repeated one or more times. Optionally in the case of a polymer film, stretching can be performed biaxially, with longitudinal and transverse stretching taking place either sequentially or simultaneously. The stretching conditions can be chosen depending upon the nature of the polymer used, including the thermal characteristics, the molecular weight and/or the molecular weight distribution of the polymer. The conditions to be chosen for a specific polymer are readily determined according to standard solid state drawing procedures.

As mentioned above, carbon nanotubes are used for reinforcement in the present invention. By carbon nanotubes it is meant carbon tubes having a structure related to the structure of Buckminsterfullerene ($C_{60}$). Although often termed carbon nanotubes because of their diminutive dimensions, the carbon nanotubes used in the present invention need not necessarily have dimensions of the order of nanometers in size. The dimensions of the nanotubes can be much greater than this. However, it is preferred that the nanotubes are of a diameter from 1–50 nm, more preferably about 10 nm. Preferably the nanotubes are 1 $\mu$m or more in length, more preferably about 10 $\mu$m in length. Thus, it is preferred that the nanotubes are endowed with a high aspect ratio, having a length/diameter (L/D) of 100 or more, preferably $10^3$ or more and most preferably $10^4$ or more. Therefore, composites containing these nanotubes should, when the nanotubes are properly aligned, have mechanical properties which behave similarly to those of composites containing continuous carbon fibres.

Increasing the aspect ratio of the nanotubes (at constant nanotube volume fraction and orientation) leads to enhanced strength and stiffness in the composite. A long aspect ratio makes it less important to functionalise the polymeric matrix as well as the nanotubes to give good covalent binding and ensure good interfacial shear strength.

It should be noted that the use in the present invention of effectively non-continuous nanotubes (short in comparison to regular carbon fibres) rather than continuous fibres, allows access to typical processing techniques useful for thermoplastics. These techniques permit high throughput production and fabrication of high quality, complex shaped composites. Furthermore, due to their high strength and small diameter, the high aspect ratio of the nanotubes will not be decreased by typical polymer processing operations such as extrusion and injection. Thus polymer composites comprising nanotubes can provide the best of both worlds: high mechanical strength and ease of processing.

The quantity of carbon nanotubes added to a given quantity of polymer is not particularly limited. Typically less than 50% wt. of carbon nanotubes or less is added to the polymer. Preferably 30% wt. or less and more preferably 20% wt. or less of nanotubes is added. It is most preferred that 5% wt. or less of nanotubes is added. A very small quantity of nanotubes is capable of beneficially affecting the properties of a polymer, such that very small quantities can be used, depending on the intended use of the polymer. However, for most applications it is preferred that 0.1% wt. of nanotubes or greater is added.

The method of manufacture of the polymers used in the present invention is not especially limited. In one preferred embodiment, the carbon nanotubes are mixed with the monomer, prior to carrying out the polymerisation procedure. Thus, in this embodiment the polymer is formed in situ in the presence of the carbon nanotubes.

The present invention extends to a reinforced polymer obtainable according to the methods of the present invention. The reinforced polymers of the present invention have superior mechanical properties, as has been discussed above. These properties are particularly marked in the case where the polymers are spun into fibres. Typically, fibres formed from the present reinforced polymers have a high modulus (10%), a high tenacity whilst still retaining a relatively high toughness. It is preferred that the modulus (10%), the tenacity and/or the toughness of fibres formed from the present reinforced polyolefin are greater by at least 15%, as compared with the equivalent properties of the same polymer not comprising carbon nanotubes after undergoing the same stretching procedure.

Any additives typically introduced into polymers can be included in the present reinforced polymers, provided that the additives do not prevent the enhaced mechanical properties of the present polymers being obtained. Thus, additives such as pigments, anti-oxidants, UV-protective HALS, lubricants, anti-acid compounds, peroxides, grafting agents and nucleating agents can be included.

Embodiments of the present invention will now be described in the following by way of example only.

EXAMPLES

Synthesis of nanotubes

The nanotubes used in the present invention were obtained by catalytic decomposition of acetylene on a metallic catalyst (cobalt salt deposited onto zeolites or silica gels) according to K. Hernadi et al, Catalysis Letters, 48, 229, 1997. Silica-supported catalyst samples (prepared from Co-acetate solution of different pH) were tested in the decomposition of acetylene. Catalysts with various pretreatments (different calcination temperature, time and atmosphere) were compared for nanotube yield and quality (quantity of turbostratic straight and helical tubes).

Apparatus

In the following examples, melt compounding of the polyethylene (PE) and polypropylene (PP) with the nanotubes was carried out using a MiniMax mixer (see B. Maxwell, "SPE J., 28, 24, 1972).

Films were produced by compression moulding between Mylar® (Du Pont) PET sheets above the melting points of the polyolefins (typically below 200° C.). Injection moulded tensile bars were produced with the MiniMax moulder.

Fibres were produced by blending and melting the polyolefin in the MiniMax, cutting pieces from an extruded strand, feeding the pieces into the barrel of a capillary rheometer (a CEAST 1000) and melting. The extruded strand was wound onto a rotating wheel, whose rotation speed determined the final diameter of the monofilament.

Solid state stretching was carried out on a MiniMat from Rheometrics Scientific, formerly produced by Polymer Laboratories, which is a miniature tensile tester equipped with an oven (see F. Biddlestone et al "The application of the MiniMat to plastic fracture: a review", Polymer Testing, 6, 163, 1986).

The titer of the fibre is the mass of the fibre per unit length, measured in g/10 km. The titer was determined using a Lenzing vibroscope.

Tensile Properties Measurements

The tensile properties of the melt-spun filament, the films, and the injection-moulded bars, were tested at room temperature in a tensile machine (a MiniMat for the films and the bars and a Lenzing for the fibres). The methods employed were carried out according to ISO 5079.

The conditions of testing were thus as follows:
Temperature 23° C.
Gauge length 10 mm
Cross head speed 10 mm/min Tensile Parameter Definitions Rigidity was estimated at 10% strain (10×force at 10% strain divided by the titer of the unstretched fibre). Force is expressed in cN. The tenacity is the force at break divided by the titer of the fibre. For iPP (used in the following Examples) 1 cN/Tex is equivalent to 9 MPa. The strain at break was expressed in %: $(L/L_0)*100$, with $L_0$ being the gauge length (10 mm). The maximum strain was 600% and was limited by the machine maximum traverse length.

Birefringence

The birefringence ($\Delta n$) is defined as the difference between the refractive index (n) of a fibre measured parallel to its axis, and that measured perpendicularly to its axis. It was measured in the following Examples using a Berek compensator (Zeiss-Germany) and utilised according to the method described in "Polarised light microscopy: principles, instruments, applications", W. J. Patzelt, $3^{rd}$ edition, E. Leitz Wetzlar (1985) p65–67.

Birefringence is a measure of degree of orientation in the polymer. The greater the birefringence, the greater the degree of orientation in the polymer.

Stretch Ratio (SR)

The solid state drawing carried out in the following Examples was conducted by selecting a specific SR for stretching. The SR is the ratio of the lengths of the fibre after and before the drawing step. It is equivalent to the ratio of the cross section (or titre) after and before the drawing step. Thus SR 2.5 refers to a 2.5 fold increase in the fibre length as a result of stretching. SR max refers to the maximum stretching possible without breaking the fibre. In each case in the following Examples the solid state drawing step was conducted at 110° C.

EXAMPLE

To 10 g of isotactic polypropylene (iPP) reactor powder (having a melt flow index (MFI) of 10, determined at 230° C. with a 2.16 kg load according to ISO 1133) 0.3 g (3% wt. based on the weight of the polymer) of carbon nanotubes were added. Also added were 3000 ppm of anti-oxidant (B215 from Ciba) and 500 ppm of calcium stearate. The iPP powder, the additives and the nanotubes were well dispersed using a high shear mixer. 1.6 g of the blended material was introduced into the mixing chamber of a MiniMax moulder, which was heated at 220° C. The mixture was maintained at 220° C. for 1 minute under an argon atmosphere and the axial rotor was rotated at 80 rpm for 2 minutes, allowing further intimate blending of the nanotubes and the iPP.

The above procedure was repeated for iPP in the absence of nanotubes and for iPP in the presence of 3% wt. carbon black (blackpearl) in the place of nanotubes.

For each of the above three mixtures, a strand was extruded from the MiniMax and cut into small pieces. The pieces were fed into the heated cylinder of a CEAST 1000 capillary rheometer at a temperature of 185° C. The molten polymer was extruded through a capillary (length to diameter ratio of 5 to 1 mm) and the strand was wound onto a rotating wheel. For each of the above three mixtures, nominal 11 dTex fibres (approximately 40 $\mu$m in diameter) were produced.

Before subjecting the extruded fibres to a solid state drawing procedure, single fibres formed from each of the three mixtures were tested for their tensile properties and their titer (dTe=g/10 km of fibre). Titer was measured using a vibroscope. The results of the tests are shown in Table 1 under the heading Comparative Example.

A first orientation procedure in the solid semi-crystalline state was conducted on partially oriented melt-spun fibres in a MiniMat at 110° C. with a slow strain rate (10%/min with a gauge length of 10 mm). The maximum elongation was limited to a stretch ratio (SR) of 2.5. The fibres were easily stretched under these conditions (no breaking occurred during stretching). Single fibres formed from each of the three mixtures were again tested for their tensile properties. The results of the tests are shown in Table 1 under the heading Example A.

An alternative orientation procedure in the solid semi-crystalline state was conducted on unoriented melt-spun fibres at 110° C. with a slow strain rate (10%/min with a gauge length of 10 mm). The maximum elongation was limited to the maximum stretch ratio just before break ($SR_{max}$). Single fibres formed from each of the three mixtures were again tested for their tensile properties. The results of the tests are shown in Table 1 under the heading Example B.

window is possible for iPP fibres of modest orientation. Thus, non-woven fabrics having high strength, stiffness and toughness can be produced using the present fibres.

TABLE 1

| Example | Additive | Fibre fabrication | Ti (dTex) | SR | Δn (*1000) | e Break (%) | E 10 (cN/Tex) | E 5 (cN/Tex) | E 1 (cN/Tex) | Te (cN/Tex) |
|---|---|---|---|---|---|---|---|---|---|---|
| Comparative | None | melt-spun | 11.3 | 1 | 10 | 600 | 4.7 | — | — | 11.4 |
| Example | 3% C black | melt-spun | 10.3 | 1 | 10.5 | 580 | 4.1 | — | — | 8.5 |
|  | 3% C nanotubes | melt-spun | 6.3 | 1 | 11 | 500 | 4.2 | — | — | 9.4 |
| Example A | None | SR 2.5, (110° C.) | 4.8 | 2.4 | 25 | 60 | 130 | 210 | — | 31.4 |
|  | 3% C black | SR 2.5, (110° C.) | 4.3 | 2.4 | 25 | 75 | 150 | 240 | — | 28 |
|  | 3% C nanotubes | SR 2.5, (110° C.) | 2.5 | 2.5 | 27 | 47 | 450 | 650 | — | 65 |
| Example B | None | SR max, (110° C.) | 2.1 | 5.4 | 33 | 27 | 340 | 520 | 800 | 60 |
|  | 3% C black | SR max, (110° C.) | 2.1 | 4.9 | 33 | 27 | 340 | 520 | 800 | 61 |
|  | 3% C nanotubes | SR max, (110° C.) | 1 | 6.3 | 33 | 20 | 1570 | 1800 | 2300 | 268 |

Ti: Titer
SR: Stretch Ratio
Δn: Birefringence
e Break: strain at break
E 10: Secant modulus at 10% strain
E 5: Secant modulus at 5% strain
E 1: Secant modulus at 1% strain
Te: tenacity at break (force at break/initial titer)

From Table 1, it can be seen that in the Comparative Example in which no solid state drawing was carried out, no improvement in tensile properties was seen and in fact a slight decrease in strain at break was observed.

However, performing moderate solid state stretching at an SR of 2.5 (Example A in Table 1) led to an improvement in tensile properties. A higher stiffness, tensile strength and energy-absorption capability was observed, whilst the strain at break remained within acceptable limits. Thus the E10 and E5 are improved by approximately a factor of 3 in comparison with fibres stretched under the same conditions which contain no additive or contain only carbon black.

When stretching the fibres to their maximum capability (SR max) (Example B in Table 1) an extremely high tenacity and E 10 are observed for the fibres containing nanotubes (approximately a 4-fold increase over the reference fibres). The strain at break remains within acceptable limits.

In the latter example, the tenacity is approximately twice the highest reported value for high tenacity iPP fibres (with a maximum tenacity of 130 cN/Tex). The extension at break is still comparable to the reference fibres, hence the reinforced fibres are endowed with enhanced toughness. The stiffness could only be assessed at 1% strain and was measured at approximately 2300 cN/Tex (21 GPa). The theoretical upper modulus (based on 1.4% volume fraction of perfectly aligned nanotubes in a highly oriented iPP fibre) should be between 38 GPa and 70 GPa depending on the value of the E modulus for the nanotubes (from 2000–5000 GPa).

Thus the reinforced polymers of the present invention have tensile properties comparable with the theoretical maximum obtainable values and are significantly improved over known reinforced polymers.

Furthermore, since excellent tensile properties are obtained for fibre comprising nanotubes which have been subjected to solid state drawing with an SR ratio of only 2.5, then thermal bonding in the normal processing temperature

We claim:
1. A method for the production of a reinforced polymer comprising:
   (a) introducing carbon nanotubes into a polymer to provide a mixture of the polymer and the nanotubes;
   (b) fiber melt spinning, extruding thermoforming or injection molding the mixture at or above the melting temperature ($T_m$) of the polymer whereby the mixture is stretched; and
   (c) drawing the mixture at or above the glass transition temperature ($T_g$) of the polymer to form a fiber or sheet whereby the mixture is further stretched.
2. A method according to claim 1, wherein step (b) comprises extruding the mixture.
3. A method according to claim 2, wherein a polymer fibre or a polymer sheet is produced in the extrusion step.
4. A method according to claim 1, wherein step (c) comprises stretching the mixture at a temperature from the glass transition temperature ($T_g$) of the polymer to the melting temperature ($T_m$) of the polymer.
5. A method according to claim 1, wherein step (c) comprises solid state drawing.
6. A method according to claim 1, wherein 50% by weight or less of carbon nanotubes is introduced into the polymer.
7. A method according to claim 1, wherein the carbon nanotubes are introduced into the polymer by contacting the nanotubes with a monomer and then polymerising the monomer in the presence of the nanotubes to form the mixture.
8. A method according to claim 1, wherein the polymer comprises a fibre-forming polymer.
9. A method according to claim 1, wherein the polymer comprises a polymer selected from the group consisting of a polyolefin, a polyester and a polyamide.
10. A method according to claim 9, wherein the polyolefin comprises a polymer selected from the group consisting of a polyethylene and a polypropylene.

* * * * *